United States Patent [19]

Unema et al.

[11] 3,819,273

[45] June 25, 1974

[54] LIGHT TARGET AND SENSOR

[75] Inventors: Norman P. Unema, Hudsonville; James Stapert, Jr., Grand Rapids, both of Mich.

[73] Assignee: Laser Alignment, Inc., Grand Rapids, Mich.

[22] Filed: Feb. 14, 1972

[21] Appl. No.: 225,894

[52] U.S. Cl.................. 356/152, 33/293, 328/140, 356/152, 356/172
[51] Int. Cl. ........................................... G01b 11/26
[58] Field of Search ............ 356/152, 172; 250/204, 250/202; 172/4.5; 33/293; 328/138, 140; 307/234; 340/171 R, 167 R

[56] References Cited
UNITED STATES PATENTS

| | | | |
|---|---|---|---|
| 3,012,469 | 12/1961 | Clayborne | 356/172 |
| 3,305,732 | 2/1967 | Grossman et al. | 328/140 |
| 3,494,426 | 2/1970 | Studebaker | 172/4.5 |
| 3,499,155 | 3/1970 | Turbett | 250/202 |
| 3,518,558 | 6/1970 | Miller et al. | 328/140 |
| 3,588,249 | 6/1971 | Studebaker | 356/172 |
| 3,588,255 | 6/1971 | Alexander | 356/172 |

*Primary Examiner*—T. H. Tubbesing
*Assistant Examiner*—S. C. Buczinski
*Attorney, Agent, or Firm*—Price, Heneveld, Huizenga & Cooper

[57] ABSTRACT

A plurality of light sensitive cells are positioned on a target face for receiving a moving beam of light from a light beam generator. The generator develops a datum plane of light. The cells are operatively associated with an electric circuitry connected to lights for translating visually whether the target is high, centered or low relative to the plane of light generated by the oscillating laser beam. The cells include portions offset from the other to permit independent or simultaneous interception thereof by the plane of light. The target by means of the light beam designates or depicts its position with respect to the plane of light intercepting the target either intermediate each cell, or on one or more of said cells. The target face is rotatable about an axis to adjust the positions of the cells relative to the plane of projected light thus providing a means for varying the high, centered or low reading produced by the target.

22 Claims, 11 Drawing Figures

PATENTED JUN 25 1974 3,819,273

LIGHT TARGET AND SENSOR

BACKGROUND OF THE INVENTION

This invention relates to an electronic gauging instrument, and more particularly to a unique target and sensor which receives a datum plane of light to indicate visually whether the target is high, centered or low.

The method of establishing accurate grade control in various environments such as the digging of trenches has become quite refined in recent years with the advent of the utilization of a highly collimated light source known as the laser. With the development of the laser, this method has become widely adopted. Further improvements provide the projection of a datum plane of light instead of a single stationary beam to improve the flexibility and accuracy in the target portion of the system. Such an improved apparatus for fanning a laser beam and adjusting its grade is disclosed in a copending application filed simultaneously herewith entitled Laser Fanning Device, Ser. No. 225,969.

The main drawback to existing targets and sensors is threefold; 1) they are not capable of sufficient accuracy adjustment; 2) they are not simple for the operator to read and correspondingly make immediate accurate adjustments, for example, of a trenching unit on which the target is mounted; and 3) they are too complex and hence expensive.

Thus, there is a need in this art for an improved target and sensor which receives a moving beam of light from the light generator and translates it into a simple read-out system which immediately tells the operator whether the target is high, low or centered relative to the datum plane of light.

SUMMARY OF THE INVENTION

The target and senor provided by this invention are designed particularly to cooperate with the apparatus of the copending application identified above. It will, however, work equally well with any type of light source which projects a datum plane of light. The target and sensor are designed to provide a read-out to indicate to the operator whether the target is on center or to one side or the other of the datum plane.

In accordance with the invention, a target having a target face is mounted to a support means and includes at least two photo-detector means on the target face interconnected to an indicator means by an electrical means which operates the indicator means to provide a signal indicating the relative position of the target with respect to the plane of light. The target is rotatable to position a portion of the photo-detector means such that receipt of the light signal by one or the other only will indicate that the target is to one side or the other of the datum plane. Photo-detector means are also alignable relative to the light source such that when the target is centered relative to the datum plane, the light beam will be received simultaneously by both detector means or strike in a space intermediate the two detector means.

In a preferred aspect, the target means is mounted on a device such as a trenching unit whereby the target face is directed towards the light source set up at a distance removed from the target. With the target indicating that it is centered, the trenching operation is begun and the operator simply monitors a three-light read-out panel which will alert him to whether the target is centered, high or low. Depending on the accuracy required of the target, the face is rotated to vary the thickness of the target or the gap between the two photo-detector means or overlap portion. The simplicity of the apparatus is enhanced by its relative lack of extensive components since it requires but two photocells; a relatively simple electric circuitry and battery power source; and three lights on the read-out panel.

DESCRIPTION OF THE PREFERRED EMBODIMENT

Figure 1:
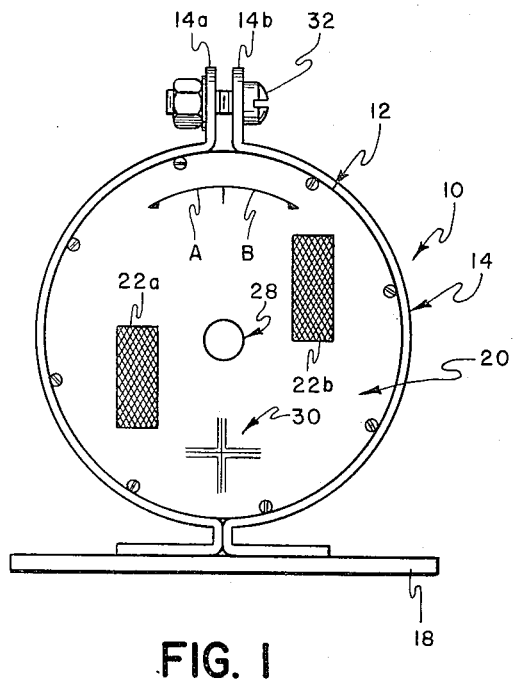
FIG. 1 is a front elevation view of the target and target face proposed by the invention.
Figure 2:
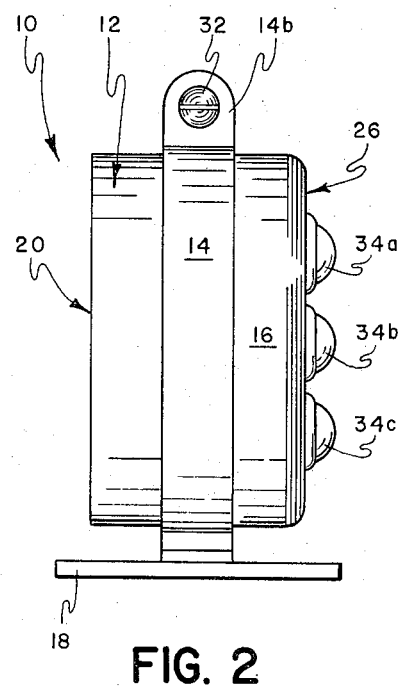
FIG. 2 is a right side elevation of the target illustrated in FIG. 1.

Referring now to the drawings, FIGS. 1 and 2 show a target and sensor 10 comprising a cylindrically shaped housing 12 which is held by a frame 14 which circles the sides 16 of the housing. Frame 14 is affixed to a support 18 such as for example, the superstructure of a trenching machine (not shown). The frame 14 clamps around the target and can be released to permit rotation of the target relative to the frame for adjusting the range of the target as will be described in more detail hereinafter.

The following description pertains generally to a trenching apparatus and hence the terminology of high, centered and low is used for convenience. It will be appreciated, however, that in broader aspects, the sensor ascertains the relative position of the target to one side or the other of the datum plane of light and hence the terms "high" and "low" are not meant to be restrictive.

The target face 20 includes a pair of photocells 22a and 22b which are positioned on face 20 such that a plane of laser light L (FIGS. 3 and 4) generated by oscillating movement of a laser beam is capable of striking one, both or intermediate the photocells in order to register a visual signal telling the operator whether the target is high, low or centered. The sensing of the photocells is translated by an electrical circuitry 24 (FIG. 5) into an output signal which actuates one of three lights, 34a 34b or 34c on a three-light panel 26 to provide a simple readout for the operator. The plane of light, be developed by an oscillating laser beam or other source, has a finite thickness.

Referring now to the drawings in greater detail, the target face 20 of the target and sensor 10 is adapted for exposure towards a light source (not shown) which is capable of developing a collimated plane of light. In this regard, a preferred source is described and claimed in the above identified copending application, Ser. No. 225,969 filed simultaneously herewith. The source of light utilized therein is preferably a laser beam generator mounted on a surveyor's transit above a suurveyor's scope to direct the laser beam in the selected direction. Generally, the axis of the scope and laser beam are parallel and hence although the beam's center is to be directed to the center 28 of the target face 20 as illustrated in FIG. 1, the aiming point 30 as shown on face 20 is vertically offset beneath beam center 28 in order to compensate for the vertical spacing between the laser generator and transit scope.

Figures 3A, 3B, 3C, 3D:
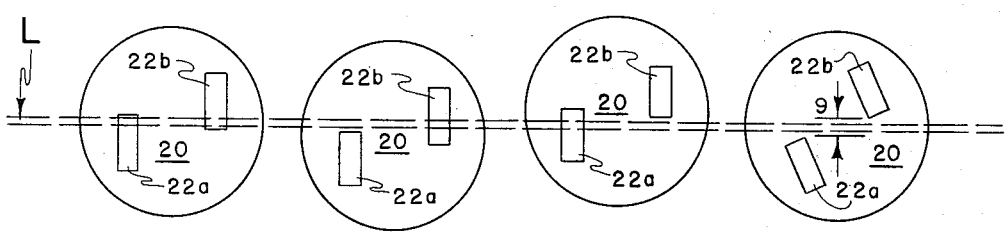
FIGS. 3A, 3B, 3C, and 3D illustrates four alternative configurations of the target relative to a datum plane of light to indicate whether the target is high, centered or low.

A pair of light-sensitive photoelectric cells 22a and 22b are mounted in the face 20 of target 10 for receiving the laser beam. Preferably, each cell has a vertically elongated rectangular configuration and is spaced from the other laterally to each side of the center 28. The normal positioning of these cells is such that the left cell 22a (FIG. 1) has a substantial portion lying in the lower left quadrant of target face 20 with the remaining portion extending through and above the plane of the center of the target into the upper left quadrant. Conversely, the right photocell 22b substantially lies in the upper right quadrant with the remaining portion lying in the lower right quadrant. In this fashion, when the laser beam is centered or on target, it will be received by both photocells 22a and 22b as illustrated in FIG. 3A. It will be appreciated that the target center in this case as defined by the overlapping vertical portions of cells 22a and 22b has a finite thickness above and below the center point of the target. Furthermore, with the unique rotational adjustment aspects to be described in more detail, the overlapping vertical portions of cells 22a and 22b are not dimensionally critical or an absolute requirements. The overlap is, however, used as an aid to initially set up the sensor for operator convenience.

When the laser beam is received only by cell 22b, as illustrated in FIG. 3B, the target is off center and low which means that the target and its associated instrument must be raised to bring it back on center. Assuming that the target is mounted on a trenching unit, once the operator realizes that the target is low, the trencher must be adjusted upwardly. Should the laser beam be received only by photocell 22a, as illustrated in FIG. 3C, the target is high indicating that the trencher must be lowered to center the target back onto the plane of the beam.

The target is adjustable by rotating the entire mechanism 10 relative to frame 14. As noted earlier, frame 14 encircles the sides 16 of the target housing 12. The frame is in two parts, with each part including an upwardly projecting flange 14a and 14b. A threaded mechanical fastener 28 provides the means for clamping frame 14 about target 10. To rotate the target about a generally horizontal axis relative to frame 14 and support 18, fastener 28 is loosened to permit manual movement of the target.

Figures 4A, 4B:
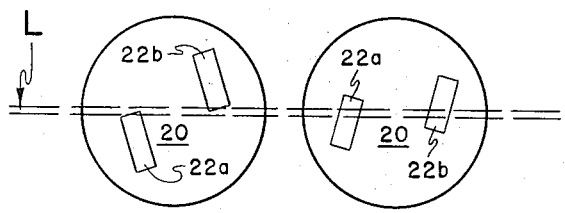
FIGS. 4A and 4B illustrates two of the alternative configurations to that shown in FIG. 3.

To increase the accuracy of the target, it is rotated in a counterclockwise direction as illustrated by arrow A in FIG. 1. This decreases the overlap between photocells 22a and 22b across the horizontal plane of the beam's center. As illustrated in FIG. 4A, proper adjustment in this regard will create an extremely narrow range or accurate target such that the laser beam L will simultaneously strike photocells 22a and 22b only in a particularly accurate or fine position. On the other hand, where such accuracy is not required, the accuracy can be essentially decreased by rotating the target in a clockwise direction as illustrated by arrow B in FIG. 1 such that a larger and larger portion of photocells 22a and 22b extend across the horizontal plane of the beam, in which event, as illustrated in FIG. 4B, an extremely wide latitude is presented to the laser beam wherein the beam strikes both photocells simultaneously.

It will be appreciated that continued counterclockwise rotation of target 10 past the point illustrated in FIG. 4A will position photocells 22a and 22b in such a way that neither cell can simultaneously receive laser beam L. That is, there is a vertical gap or spacing G between the cells (FIG. 3D) which exceeds the thickness of the datum plane of light. This form of orientation can be utilized as an alternative indication of when the target is on center in which case, as will be described shortly, the target is modified to indicate "on center" when the light beam L strikes intermediate the cells 22a and 22b in gap G. At the same time, receipt of the beam by cell 22a only will still indicate that the target is high while receipt of the signal by cell 22b only will still indicate that the target is low as illustrated in FIGS. 3B and 3C. Again, rotation of the target will increase or decrease the range of accuracy to which the target is centered.

Generally, the target will be arranged such that panel face 26 faces the operator. In a normal trenching operation, the operator will begin the trenching operation at a point close to the light source and move away from it. With the trencher at proper depth the panel light 34b will be lit as the laser beam energizes to indicate that the target is centered. As the trencher moves, should it begin digging too low, light 34c will become actuated with 34b being extinguished. Should the trenching become shallow, light 34a will be actuated with both lights 34b and 34c being extinguished. In other words, lights 34a, 34b and 34c are mutually exclusive of each other in that only one will be operative at any one time.

Figure 5:
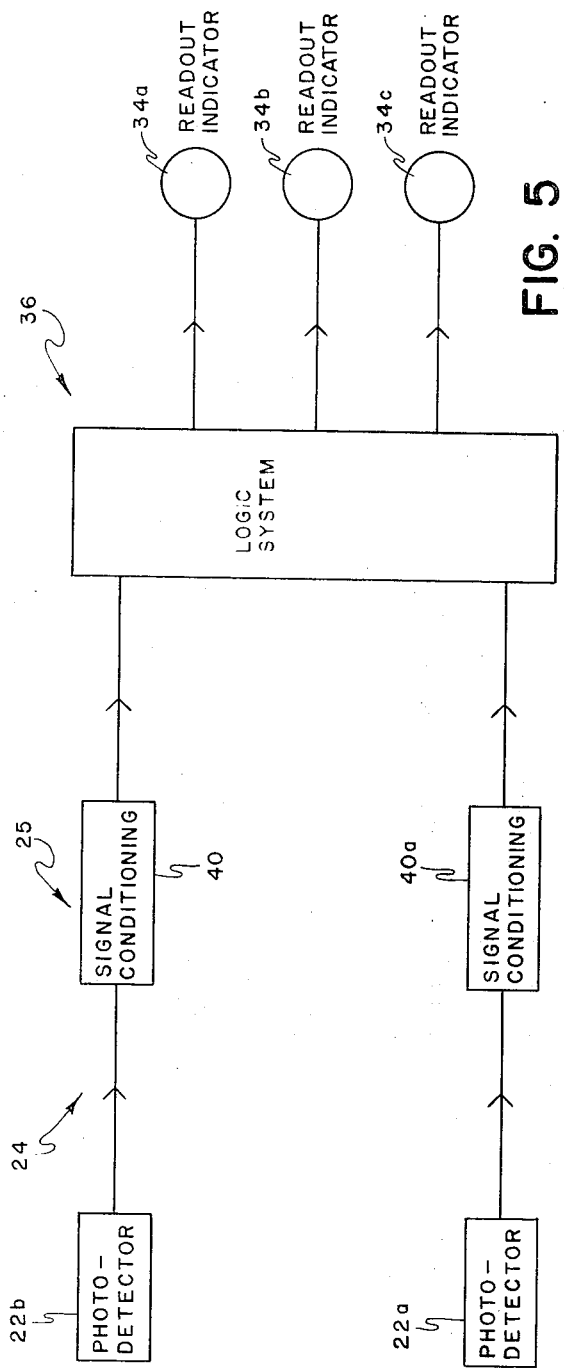
FIG. 5 is a block diagram of the electrical circuitry provided by the invention.

Referring to FIG. 5, a block diagram of the electrical circuitry is illustrated. This diagram discloses the photocells 22a and 22b of the type sensitive to the light source being utilized. I prefer to use associated circuitry which is responsive only to changes in light level such as those generated by a plane of light created by a moving light beam as previously described. Such an arrangement permits the use of more stable, less expensive AC circuitry that does not require correction to prevent or eliminate response to ambient light such as sunlight. On the other hand, more expensive cells can be utilized in which event the cells 22a and 22b are sensitive only to a highly intensified source of light such as a laser beam. I have disclosed signal conditioning circuits 25 connecting to each of the cells 22a and 22b. The signal conditioning circuits 25 as disclosed in greater detail in FIG. 7 perform the function of passing a signal only when a moving light beam such as a pulsating light strikes the cells 22a and 22b. From here, the electrical output is translated to a logic system 36 which controls which ones of the lights 34a, 34b and 34c are energized. The particular details of the photo-detectors and logic system is not described herein since it is conventional in the art to provide a variety of mechanisms for receiving a light input and translating it to read-out indicator. For example, photo-detectors of the resistive type or cadmium sulfide type could be used wherein receipt of a light source changes the effective resistance in an electrical circuit. It will also be appreciated that obvious changes in the logic system will permit the "on target" light 34b to be excited when both of the photo detecting cells 22a and 22b are simultaneously in receipt of the laser beam or simultaneously not in receipt of the beam.

Figure 7:
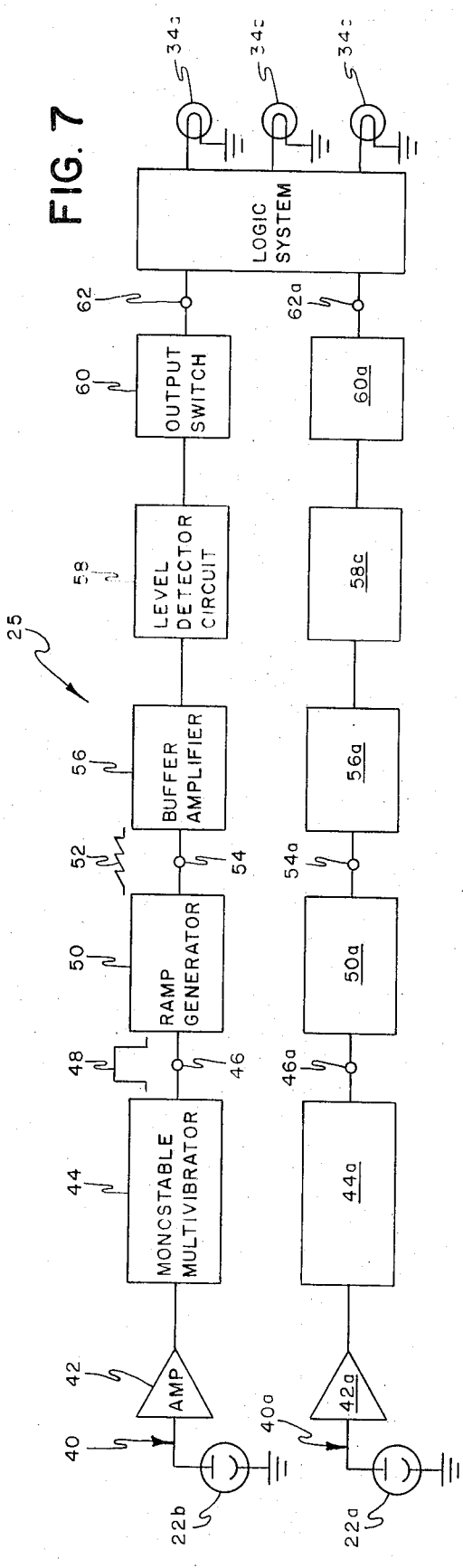
FIG. 7 is an expanded block diagram of the signal conditioning unit utilized to respond only to a pulsating light beam.

The signal conditioning circuit 25 for operating the aligning system is shown in block diagram form in FIG. 7. Referring now to the figure it is seen that the circuit 25 comprises a first channel 40 indicated generally in the figure by the series of upper block diagram circuits; and a second channel 40a indicated as the lower series of block diagram circuits. The upper channel is identical to the lower channel, thus only the upper channel operation is described.

A photo-detector cell 22b is positioned on the target and receives a pulse of light from the laser light source when the target is positioned in the path of the laser beam such that the light impinges on photo-detector 22b. The electrical output signal from photo-detector 22b is applied to a broad band width amplifier 42 which amplifies the received pulse signal and applies it to a mono-stable multivibrator 44. The signal at output terminal 46 of multivibrator 44 is shown by the waveform 48 and comprises a constant width pulse having a pulse repetition rate related to the pulse repetition rate of the light pulse detected by cell 22b. The pulses 48 from multivibrator 44 are then applied to a voltage ram generator 50. Generator 50 is comprised of a capacitor which is linearly charged through a high impedance from a voltage source and can be quickly discharged by a silicon controlled rectified (SCR) having a gate terminal alternating current coupled to output terminal 46 of multivibrator 44. The circuit details of generator 50 are not shown in the figure. Thus, with each received pulse 48, the capacitor in generator 50 is discharged thereby providing a voltage ramp output waveform 52 at output terminal 54 of the generator. The generator signal 52 is applied to a buffer amplifier 56 which isolates the capacitor from a level detecting circuit 58. Circuit 58 can be, for example, a Schmitt trigger which operates to provide an output signal to the output switch circuit 60 only when the generator signal 52 has an amplitude below the threshold of the Schmitt trigger circuit.

When continuous ambient light is received, the output signal at terminal 54 of the generator will rise above the trigger level of the Schmitt trigger since the SCR is not fired, thereby causing the output signal from circuit 58 to change states and not supply an output signal to output switch 60. The same result occurs when no light is received. During the receipt of detected light pulses from the laser source, however, the Schmitt trigger will normally provide an output signal to the output switch 60 which is actuated thereby to provide an output signal applied to input terminal 62 of a logic circuit 36.

The mono-stable multivibrator 44 supplies constant voltage, constant time width, trigger pulses to the gate of the SCR in generator 50 for consistant firing of the SCR independent of the pulse width of the signal supplied by the amplifier 42. The charging time constants of the ramp generator 50 are adjusted to result in a slow voltage rise at output terminal 54. The time required for the discharge capacitor to charge to the turn off threshold of the level detector 58 is much longer than the pulse signal 48 allowing a signal of sufficient duration to be applied to output switch 60 and thus to the logic circuit input 62. This signal time extension permits the logic circuitry to be on long enough to fully illuminate lights 34a, 34b or 34c and also permits the lamps to operate in a continuous manner if the next input signal pulse is received by the photocell before the voltage ramp generator 50 has reached the turn off threshold of the level detector circuit 58.

The signal conditioning electronics thus supply a continuous read-out display until such time as a change in display is required to denote a change of position of the target relative to the datum plane of light.

Channel 40a comprises similar circuits indicated in the figure by the same reference numerals with the addition of a suffix a and has an output switch 60a which has its output coupled to an input terminal 62a of the logic circuit 36.

The logic circuit 36 operates to actuate the read-out indicator 34a only when an output signal is received at input terminal 62; to actuate the read-out indicator 34c only when an output signal is received at input terminal 62a; and to actuate read-out indicator 34b only when both input terminals 62 and 62a receive output signals from circuits 60 and 60a, respectively. The logic circuit 36 includes positive lockout circuits to insure that when input terminal 62 is actuated, read-out indicator 34c will not be actuated, and, alternately, when input terminal 62a is actuated, read-out indicator 34a is not actuated. Logic circuit 36 also includes an aND gate to actuate read-out indicator 34b when both input terminals 62 and 62a are actuated by signals from output switches 60 and 60a, respectively.

Figure 6:
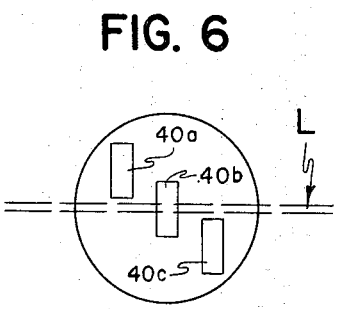
FIG. 6 is similar to FIGS. 3 and 4 illustrating an alternative embodiment utilizing three photo-detector cells.

Referring to FIG. 6, an alternative form is shown utilizing three photocells 40a, 40b and 40c. The utilization of three cells permits the number of read-out positions to be increased. The target is adjustable so that the datum plane of light could be received independently by each separate cell (3 read-out positions) or simultaneously by two adjacent cells (2 positions). If each indicator light 34a, 34b or 34c corresponded to a respective cell, the panel could indicate one of five positions of the target relative to the plane of light. For example, referring to FIG. 6, if the light beam L is centered in a grading operation, only the light associated ith cell 40b will be lit. However, when the light beam is receivable by both cells 40a, 40b or 40b, 40c, two of the three lights will be on. This could be utilized to warn the operator that the grader is approaching an unacceptable grade which would finally result if either cell 40a or 40c were exclusively in receipt of beam L. Thus, the three-cell target provides greater flexibility by increasing the number of read-out positions. Although the three photocells shown in FIG. 6 are arranged in a vertical and lateral spaced relationship, they could be oriented in a variety of offset and/or overlapping orientations in accordance with the foregoing description.

Having described the preferred embodiments of my invention, it will be appreciated that the target and sensor of the invention are simply mounted on a support structure such as a trenching machine with the target face directed toward and aligned with an oscillating beam of light such as a laser. The sensor receives the oscillating laser light from the source and translates it into a three-light read-out system. The operator merely has to observe a three-light panel to maintain the proper grade angle. Adjustment for accuracy is extremely simple by simply releasing the clamping force on the support frame and rotating the target clockwise or counterclockwise to adjust the vertical range wherein the target indicates it is on center. The utilization of conventional photocells, electrical circuitry and indicator lights provides an extremely simple and inexpensive target which is capable of extreme accuracy.

Although but two embodiments have been shown and described in detail, it will be obvious to those having ordinary skill in this art that the details of construction of the particular embodiments may be modified in a great many ways without departing from the unique concepts presented. It is therefore intended that the invention is limited only by the scope of the appended claims rather than by particular details of construction shown, except as specifically stated in the claims.

The embodiments of the invention in which an exclusive property or privilege is claimed are defined as follows.

1. Apparatus for sensing the relative position of a device with respect to a datum plane of light including a support means adapted to be secured on said device, a target and target face; the improvement comprising: at least two photo-detector means on said target face; electrical indicator means; said photo-detector means being operative when receiving a light signal to energize said electrical indicator means to provide a signal indicating the relative position of said target with respect to said plane of light; said photo-detector means being spaced about a predetermined plane; and means for rotating the target face about an axis parallel to or coincident with the datum plane of light to vary the relative position of said photo-detector means with respect to each other and said datum plane of light whereby the effective spacing of said photo-detector means for each other about a predetermined plane is varied.

2. The apparatus of claim 1 wherein said datum plane of light relative to said target means is: centered when said photo-detector means are simultaneously in receipt of said light signal; to one side of said datum plane when one of said photo-detector means only is in receipt of said light signal; and to the other side of said datum plane when the other of said photo-detector means only is in receipt of said light signal.

3. The apparatus of claim 2 wherein said target face is rotated about said axis to adjust the degree of overlap of said photo-detector means relative said datum plane of light in which both of said photo-detector means are simultaneously in receipt of said light signal.

4. The apparatus of claim 1 wherein said photo-detector means are offset to each side of said datum plane of light to define a spacing therebetween wherein said target means is centered when said light signal strikes intermediate said photo-detector means in said spacing; to one side of said datum plane when one of the photo-detector means only is in receipt of said light signal; and to the other side of said datum plane when the other of said photo-detector means only is in receipt of said light signal.

5. The apparatus of claim 4 wherein said target face is rotated about said axis to adjust the magnitude of said spacing between said photo-detector means.

6. The apparatus of claim 1 wherein said indicator means is comprised of first, second and third lights mounted on said target means, each of said lights being operable mutually exclusive of each other by said electrical means to provide a visual indication of whether said datum plane of light relative to said target means is centered or to one or the other side of said datum plane.

7. The apparatus of claim 1 wherein said photo-detector means are responsive only to a pulsating light beam.

8. The apparatus of claim 1 wherein at least three photo-detector means are mounted on said target face whereby the relative position of said target with respect to said datum plane of light is indicated by said electrical indicator means when any one of said three photo-detector means only is in receipt of said light signal, any two photo-detector means are simultaneously in receipt of said light signal, or all three photo-detector means are simultaneously in receipt of said light signal.

9. Apparatus for sensing the position of a datum plane of light relative to a device comprising: a target means; support means adapted to secure said target means on said device, said target means including at least two photo-detector means, one of said photo-detector means having portions offset to one side of and laterally of said datum plane of light with respect to the other said photo-detector means, said photo-detector means being adjustable relative to each other between a first position wherein one of said means are positionable on each side of said datum plane of light to define a spacing therebetween which exceeds the thickness of said datum plane of light; a second position wherein portions of said means overlap each other relative to said datum plane of light so that said plane of light is receivable simultaneously by both photo-detector means; and intermediate positions between said first and second positions to vary the degree of separation of overlap of said photo-detector means.

10. The apparatus of claim 9 wherein said photo-detector means are rotatable relative to said support means to vary the degree of separation or overlap of said photo-detector means.

11. The apparatus of claim 9 wherein said apparatus further includes electrical indicator means, said photo-detector means being operative when receiving a light signal to energize said electrical indicator means to provide a signal indicating the relative position of said target with respect to said plane of light.

12. The apparatus of claim 11 wherein said datum plane of light relative to said target means is centered when said photo-detector means are simultaneously in receipt of said light signal; to one side of said datum plane of light when one of said photo-detector means only is in receipt of light signal; and to the other side of said datum plane of light when the other of said photo-detector means only is in receipt of said light signal.

13. The apparatus of claim 9 wherein said plurality of photo-detector means are coplanar.

14. The apparatus of claim 9 wherein said photo-detector means are responsive only to a pulsating light beam.

15. The apparatus of claim 9 wherein said target includes three photo-detector means, one of said means being positionable on one side of said datum plane of light relative any one of the other two means in said first position; and portions of one of said means overlapping portions of any one of the other two means relative said datum plane of light in said second position.

16. The apparatus of claim 15 wherein said photo-detector means are rotatable relative to said support means to vary the degree of separation or overlap of said photo-detector means.

17. Apparatus for sensing the position of a datum plane of light relative to a device comprising: a target means; support means adapted to secure said target means on said device, said target means including three photo-detector means, each of said photo-detector means being spaced from each other, said photo-detector means being adjustable relative each other between a first position wherein one of said photo-detector is positionable on one side of said datum plane of light relative any one of the other two photo-detector means; a second position wherein portions of one of said photo-detector means overlap portions of any one of the other two photo-detector means relative said datum plane of light; and intermediate positions between said first and second positions to vary the degree of separation or overlap of said photo-detector means.

18. The apparatus of claim 17 wherein said target means is rotatable relative said support means to vary the degree of separation or overlap of said photo-detector means.

19. The apparatus of claim 17 wherein said apparatus further includes electrical indicator means, said photo-detector means being operative when receiving a light signal to energize said electrical indicator means to provide a signal indicating the relative position of said target with respect to said plane of light.

20. The apparatus of claim 17 wherein said photo-detector means are responsive only to a pulsating light beam.

21. Apparatus for sensing the relative position of a device with respect to a datum plane of light comprising, in combination: a datum plane of light developed by a pulsating light source; a target secured to said device, said target including a target face having at least two photo-detector means spaced along a predetermined plane and means for rotating the target face about an axis parallel or coincident with the datum plane of light to vary the relative position of said photo-detector means with respect to each other and said datum plane of light; electrical indicator means, said photo-detector means being operative when receiving a pulsating light signal only to energize said electrical indicator means to provide a signal indicating the relative position of said target with respect to said datum plane of light.

22. Apparatus according to claim 21 wherein said light source is a laser beam.

* * * * *

UNITED STATES PATENT OFFICE
CERTIFICATE OF CORRECTION

Patent No. 3,819,273            Dated June 25, 1974

Inventor(s) Norman P. Unema and James Stapert, Jr.

It is certified that error appears in the above-identified patent and that said Letters Patent are hereby corrected as shown below:

Column 9, line 14 continuing on line 15;
    After "photo-detector" insert --- means ---.

Signed and sealed this 5th day November 1974.

(SEAL)
Attest:

McCOY M. GIBSON JR.　　　　　　　　　　　　C. MARSHALL DANN
Attesting Officer　　　　　　　　　　　　　　Commissioner of Patents